US010358821B2

(12) United States Patent
Cawthorne et al.

(10) Patent No.: US 10,358,821 B2
(45) Date of Patent: Jul. 23, 2019

(54) THERMOPLASTIC TRUSS STRUCTURE FOR USE IN WING AND ROTOR BLADE STRUCTURES AND METHODS FOR MANUFACTURE

(71) Applicant: THE BOEING COMPANY, Chicago, IL (US)

(72) Inventors: Matthew Howard Cawthorne, Newton Square, PA (US); Christopher Eliot Wummer, Philadelphia, PA (US); Danielle Raiko Craig, Mesa, AZ (US)

(73) Assignee: THE BOEING COMPANY, Chicago, IL (US)

( * ) Notice: Subject to any disclaimer, the term of this patent is extended or adjusted under 35 U.S.C. 154(b) by 456 days.

(21) Appl. No.: 14/635,272

(22) Filed: Mar. 2, 2015

(65) Prior Publication Data
US 2016/0257396 A1  Sep. 8, 2016

(51) Int. Cl.
*E04C 2/36* (2006.01)
*B64C 1/06* (2006.01)
(Continued)

(52) U.S. Cl.
CPC ............ *E04C 2/36* (2013.01); *B29C 65/02* (2013.01); *B29C 66/1122* (2013.01); *B29C 66/21* (2013.01); *B29C 66/474* (2013.01); *B29C 66/69* (2013.01); *B29C 66/72* (2013.01); *B29C 66/73921* (2013.01); *B29D 99/001* (2013.01); *B29D 99/0028* (2013.01);
(Continued)

(58) Field of Classification Search
CPC ... B29C 66/71; B29C 66/7212; B29C 66/721; B64C 1/061; B64C 1/068; B64C 1/064; B64C 1/06; E04C 2/365; E04C 2/36; B23B 3/12; Y10T 428/24149
See application file for complete search history.

(56) References Cited

U.S. PATENT DOCUMENTS 3,419,456 A   12/1968  Tenney
4,453,367 A *  6/1984  Geyer ................. E04C 2/365
                                          264/177.12
(Continued)

FOREIGN PATENT DOCUMENTS

GB        836461 A    6/1960

OTHER PUBLICATIONS

European Search Report dated Jul. 28, 2016 for Application No. 16155999.2.

*Primary Examiner* — Andrew J Triggs
(74) *Attorney, Agent, or Firm* — Patterson + Sheridan, LLP

(57) ABSTRACT

The present disclosure generally relates to thermoplastic truss structures and methods of forming the same. The truss structures are formed using thermoplastic materials, such as fiber reinforced thermoplastic resins, and facilitate directional load support based on the shape of the truss structure. In one example, multiple two-dimensional patterns of fiber reinforced thermoplastic resin are disposed on one another in a saw tooth pattern, sinusoidal pattern, or other repeating pattern, and adhered to one another in selective locations. The two dimensional patterns may then be expanded in a third dimension to form a three-dimensional, cross-linked truss structure. The three-dimensional, cross-linked truss structure may then be heated or otherwise treated to maintain the three-dimensional shape.

19 Claims, 12 Drawing Sheets

(51) Int. Cl.
| | |
|---|---|
| *B64C 27/473* | (2006.01) |
| *B29C 65/00* | (2006.01) |
| *B29D 99/00* | (2010.01) |
| *B29C 65/02* | (2006.01) |
| *B64C 3/22* | (2006.01) |
| *B64C 3/20* | (2006.01) |
| *B64D 37/02* | (2006.01) |
| *B64C 3/00* | (2006.01) |
| *B64C 27/32* | (2006.01) |
| *B29L 31/30* | (2006.01) |
| *B29L 31/08* | (2006.01) |
| *B29C 65/78* | (2006.01) |
| *B29C 65/16* | (2006.01) |
| *B29L 28/00* | (2006.01) |
| *B29K 701/12* | (2006.01) |

(52) U.S. Cl.
CPC ............... B64C 1/068 (2013.01); B64C 3/20 (2013.01); B64C 3/22 (2013.01); B64C 27/473 (2013.01); B64D 37/02 (2013.01); *B29C 65/16* (2013.01); *B29C 65/7841* (2013.01); *B29C 66/71* (2013.01); *B29C 66/721* (2013.01); *B29C 66/7212* (2013.01); *B29C 66/7252* (2013.01); *B29K 2701/12* (2013.01); *B29L 2028/00* (2013.01); *B29L 2031/087* (2013.01); *B29L 2031/3076* (2013.01); *B29L 2031/3085* (2013.01); *B64C 3/00* (2013.01); *B64C 27/32* (2013.01)

(56) References Cited

U.S. PATENT DOCUMENTS

| | | | | |
|---|---|---|---|---|
| 5,028,474 | A * | 7/1991 | Czaplicki | B31D 3/005 428/116 |
| 5,128,192 | A | 7/1992 | Narasaki | |
| 5,180,619 | A | 1/1993 | Landi et al. | |
| 5,328,744 | A * | 7/1994 | Kaufmann | B32B 27/06 428/116 |
| 5,342,679 | A | 8/1994 | Aochi et al. | |
| 5,700,337 | A * | 12/1997 | Jacobs | B29C 53/02 156/161 |
| 6,003,283 | A | 12/1999 | Hull | |
| 6,673,415 | B1 | 1/2004 | Yamazaki et al. | |
| 6,918,920 | B1 * | 7/2005 | Wang | A61M 25/0069 606/194 |
| 7,382,959 | B1 | 6/2008 | Jacobsen | |
| 7,589,037 | B2 * | 9/2009 | Handermann | A47C 31/001 428/920 |
| 7,653,279 | B1 | 1/2010 | Jacobsen | |
| 7,914,728 | B2 | 3/2011 | Nakamura | |
| 8,061,477 | B2 * | 11/2011 | Patel | F16L 55/033 138/122 |
| 8,800,924 | B2 * | 8/2014 | Groves | B64C 3/22 244/123.1 |
| 9,168,708 | B2 * | 10/2015 | Frantz | B29D 23/001 |
| 9,376,074 | B2 * | 6/2016 | Hundley | B60R 19/18 |
| 2003/0215613 | A1 * | 11/2003 | Jan | B29C 47/0028 428/188 |
| 2008/0051866 | A1 * | 2/2008 | Chen | A61F 2/91 623/1.11 |
| 2011/0085749 | A1 * | 4/2011 | Frei | B32B 5/022 383/117 |
| 2012/0156422 | A1 | 6/2012 | Kozar et al. | |
| 2013/0099057 | A1 * | 4/2013 | Martino Gonzalez | B64C 1/06 244/121 |
| 2013/0273347 | A1 * | 10/2013 | Jacobsen | B32B 3/26 428/304.4 |
| 2013/0284004 | A1 * | 10/2013 | Hanks | F41H 1/08 89/36.02 |
| 2013/0303067 | A1 * | 11/2013 | Doty | B32B 3/12 454/76 |
| 2013/0337207 | A1 * | 12/2013 | Mueller | B29C 70/326 428/36.4 |
| 2014/0061974 | A1 | 3/2014 | Tyler | |
| 2014/0113104 | A1 * | 4/2014 | Rozant | B32B 3/12 428/116 |
| 2014/0154444 | A1 * | 6/2014 | Kawka | B32B 5/022 428/36.3 |
| 2014/0217092 | A1 * | 8/2014 | Kawka | B32B 5/022 220/1.5 |
| 2014/0292572 | A1 | 10/2014 | Chansarkar et al. | |
| 2015/0034234 | A1 * | 2/2015 | Hanks | B29C 70/56 156/196 |
| 2015/0306861 | A1 * | 10/2015 | Mankame | B32B 37/1207 156/275.5 |
| 2015/0307044 | A1 * | 10/2015 | Hundley | B60R 19/18 293/120 |
| 2015/0343736 | A1 * | 12/2015 | Kawka | H01M 2/1653 429/144 |
| 2016/0016393 | A1 * | 1/2016 | Gabrisch | B32B 5/26 89/36.02 |
| 2016/0039164 | A1 * | 2/2016 | Tuczek | B31D 3/005 428/57 |
| 2016/0039168 | A1 * | 2/2016 | Mankame | B32B 5/02 428/189 |
| 2016/0039193 | A1 * | 2/2016 | Mankame | B60R 13/02 156/212 |
| 2016/0089817 | A1 * | 3/2016 | Hundley | B29C 35/0266 264/496 |
| 2016/0090056 | A1 * | 3/2016 | Hundley | B60R 19/18 293/120 |
| 2016/0194070 | A1 * | 7/2016 | Doty | B64C 3/26 244/123.1 |
| 2016/0214284 | A1 * | 7/2016 | Mankame | B32B 37/24 |

* cited by examiner

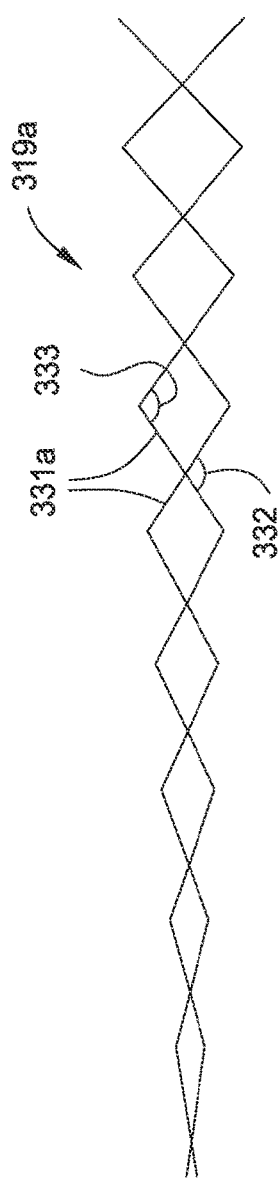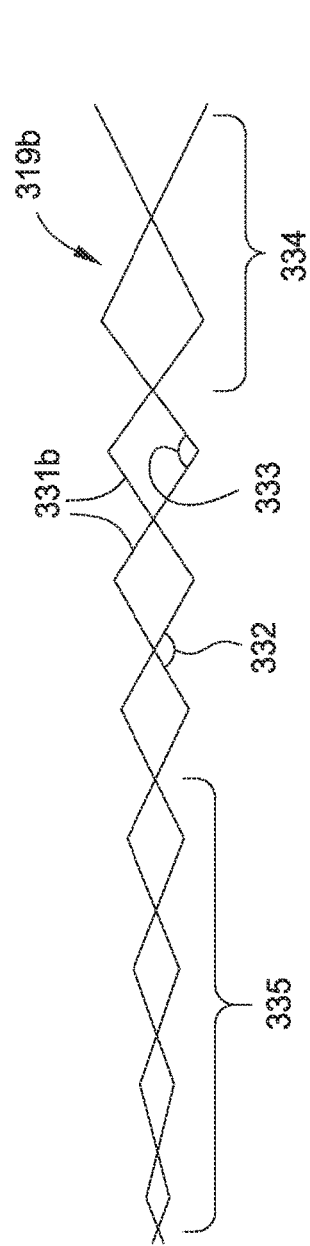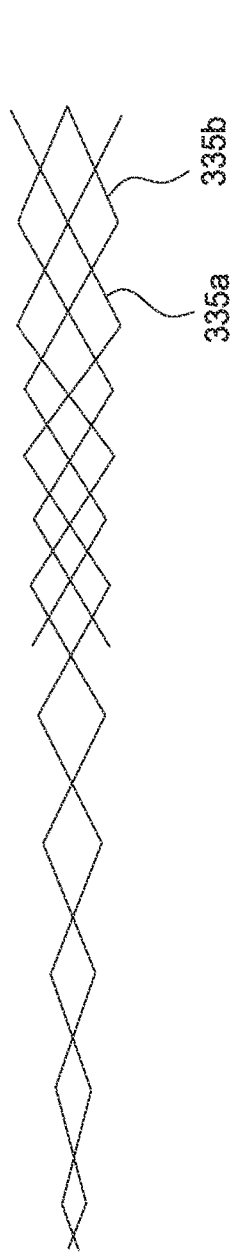

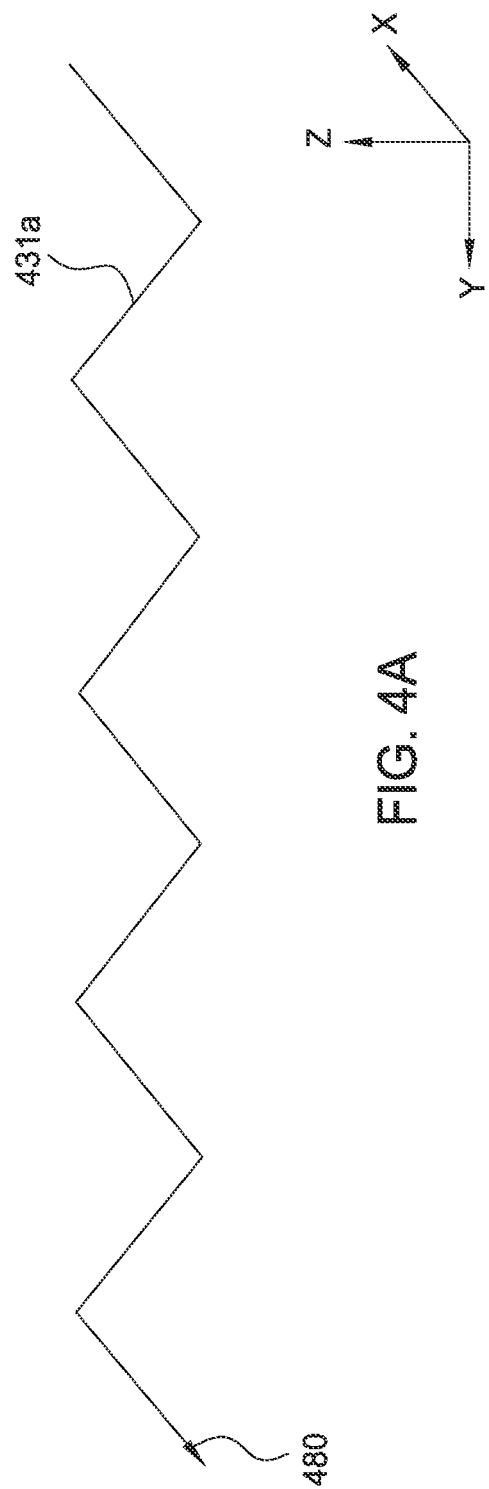

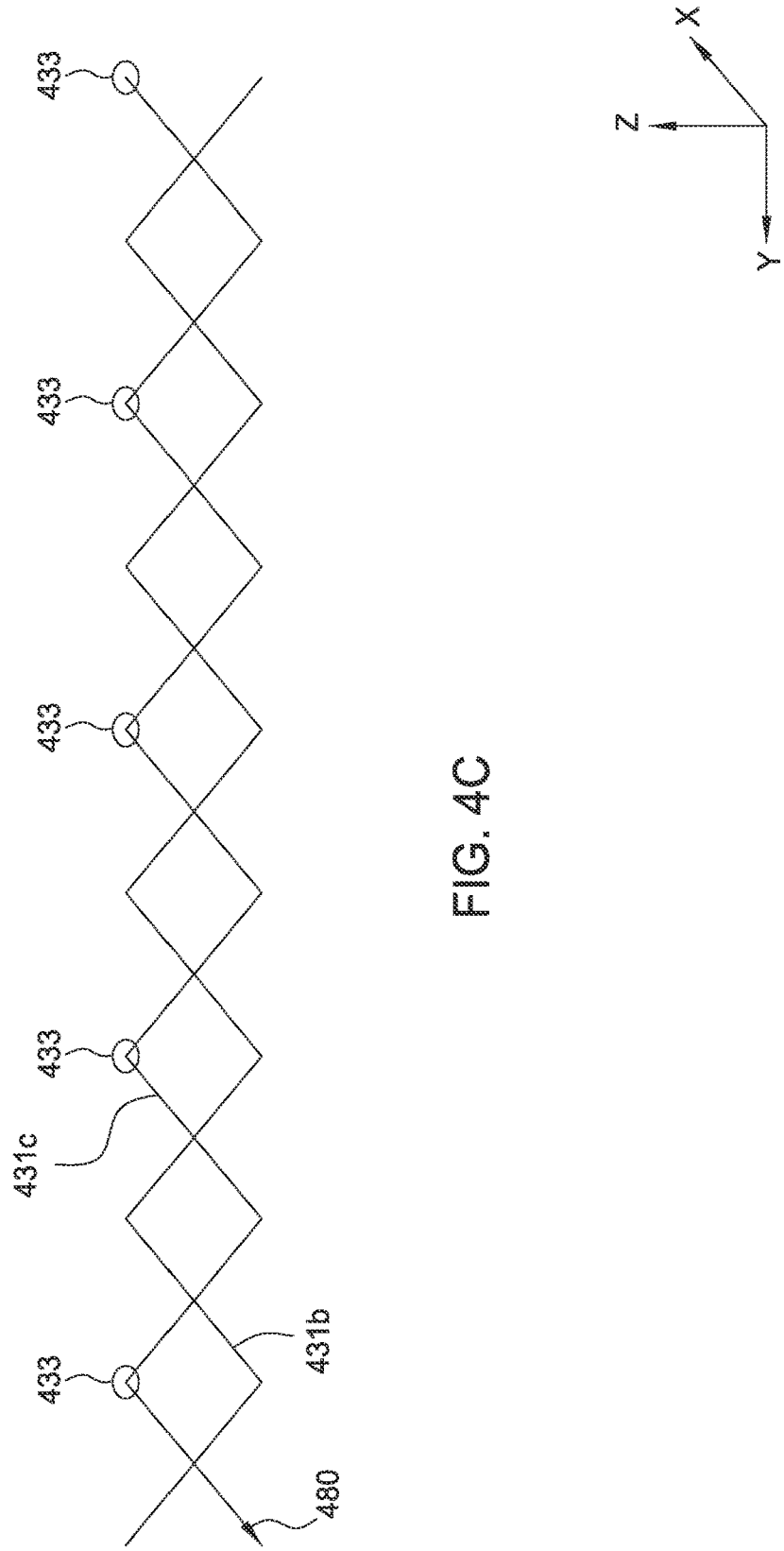

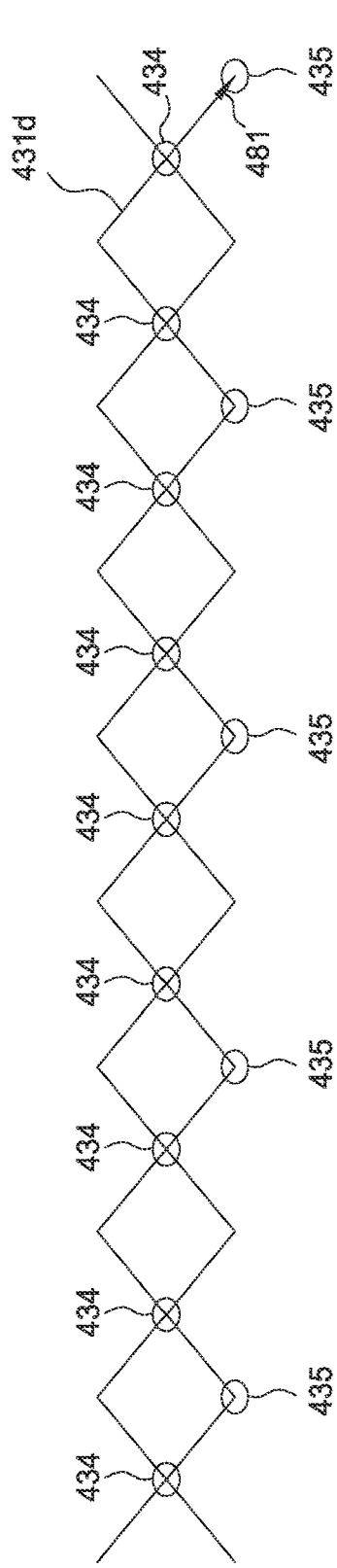
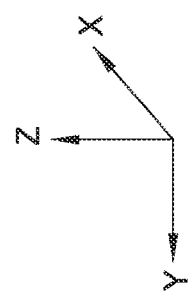
FIG. 4D

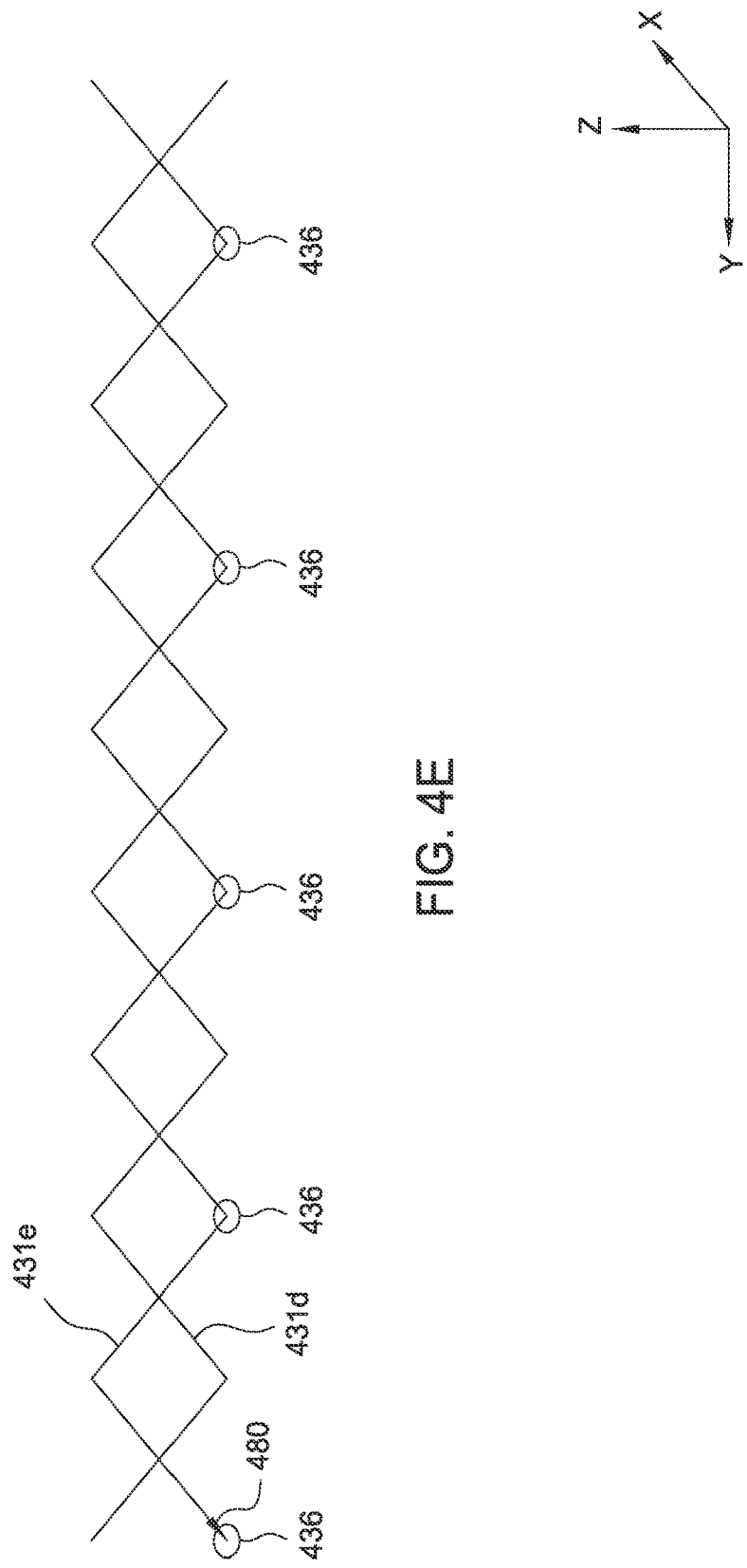

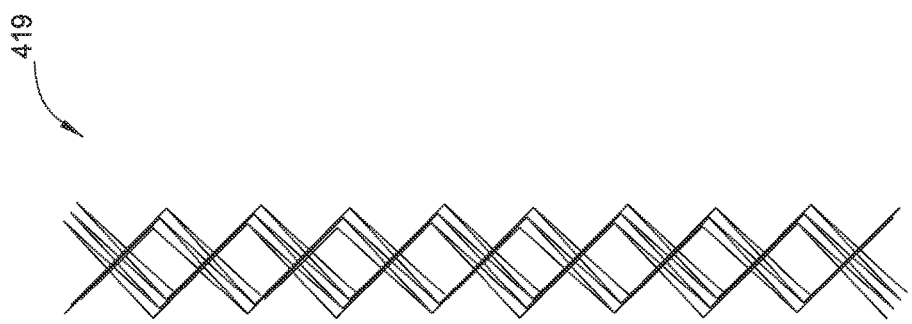
FIG. 4I
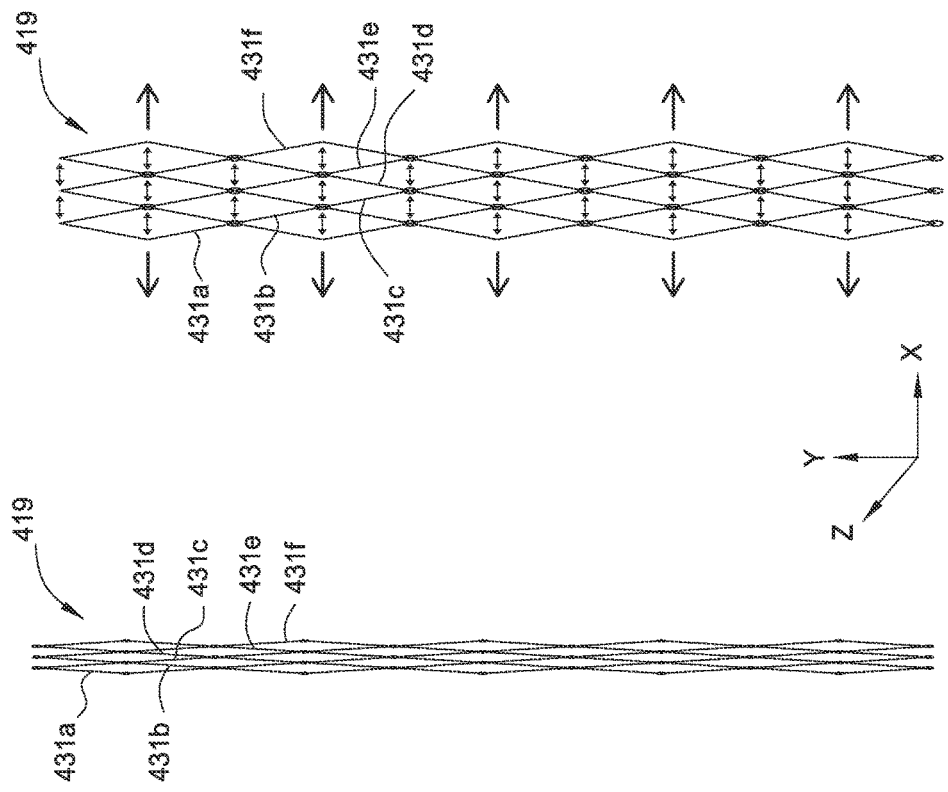
FIG. 4H
FIG. 4G

US 10,358,821 B2

THERMOPLASTIC TRUSS STRUCTURE FOR USE IN WING AND ROTOR BLADE STRUCTURES AND METHODS FOR MANUFACTURE

BACKGROUND

Field

Embodiments of the present disclosure generally relate to a lightweight thermoplastic/fiber structure for transmitting shear and maintaining the shape of fairings for wings and rotor blade structures.

Description of the Related Art

To maintain stability, torsionally soft structures such as long, slender wings and rotor blades should have a center of gravity in the forward quarter of the blade chord. Fairings are typically formed from skins and a core 'sandwich' structure. Composite materials that use thermoplastic, melt-bondable resins provide the possibility of more easily manufactured and tougher structures. Back pressure is needed when forming thermoplastic skins to create a high quality surface and to provide good adhesion of parts of assemblies.

Existing solutions utilize ribs, honeycomb structures, or foam as the core material for fairing structures. Honeycomb structures are often used in rotor blades, however, honeycomb is difficult to melt bond to thermoplastic skins as it does not provide sufficient back pressure over the open portion of the honeycomb cells. Honeycomb structures also pose problems when using soluble tooling. In particular, honeycomb structures do not provide a sufficiently open structure to wash out the soluble tooling medium, even when using a breathable honeycomb structure. Ribs may also be used to form fairing structures. However, ribs must be spaced sufficiently far apart so as not to add too much additional weight. The increased spacing between ribs requires additional stiffening components and thicker skins, which add undesirable weight.

SUMMARY

The present disclosure generally relates to thermoplastic truss structures and methods of forming the same. The truss structures are formed using thermoplastic materials, such as fiber reinforced thermoplastic resins, and facilitate directional load support based on the shape of the truss structure. In one example, multiple two-dimensional patterns of fiber reinforced thermoplastic resin are disposed on one another in a saw tooth pattern, sinusoidal pattern, or other repeating pattern, and adhered to one another in selective locations. The two dimensional patterns may then be expanded in a third dimension to form a three-dimensional, cross-linked truss structure. The three-dimensional, cross-linked truss structure may then be heated or otherwise treated to maintain the three-dimensional shape.

In one embodiment, a support structure comprises a three-dimensional, cross-linked truss structure comprising a plurality of thermoplastic wire segments bonded together. The three-dimensional, cross-linked truss structure may be used as a support structure for wings, rotor blades, fuel tanks, and other mechanical components.

In another embodiment, a method of forming a support structure comprises positioning a first wire segment of thermoplastic material, the first wire segment having a first saw tooth pattern; positioning a second wire segment of thermoplastic material over the first wire segment, the second segment wire segment having a second saw tooth pattern offset from the first saw tooth pattern; adhering the second wire segment to the first wire segment; positioning a third wire segment of thermoplastic material over the second wire segment, the third wire segment having the first saw tooth pattern, the third wire segment aligned with the first wire segment and offset from the second wire segment; adhering the third wire segment to the first wire segment; and expanding the first wire segment, the second wire segment, and the third wire segment.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of their scope, and the disclosure may admit to other equally effective embodiments.

FIGS. 3A-3C are diagrammatic representations of truss structures of varied densities, according to aspects of the disclosure.

FIGS. 4A-4L are diagrammatic representations illustrating formation of a truss structure, according to one aspect of the disclosure.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The present disclosure generally relates to thermoplastic truss structures and methods of forming the same. The truss structures are formed using thermoplastic materials, such as fiber reinforced thermoplastic resins, and facilitate directional load support based on the shape of the truss structure. In one example, multiple two-dimensional patterns of fiber reinforced thermoplastic resin are disposed on one another in a saw tooth pattern and adhered to one another in selective locations. The two dimensional patterns may then be expanded in a third dimension to form a three-dimensional, cross-linked truss structure. The three-dimensional, cross-linked truss structure may then be heated or otherwise treated to maintain the three-dimensional shape. The three-dimensional, cross-linked truss structure may be used as a support structure for wings, rotor blades, fuel tanks, and other mechanical components.

Figure 1:
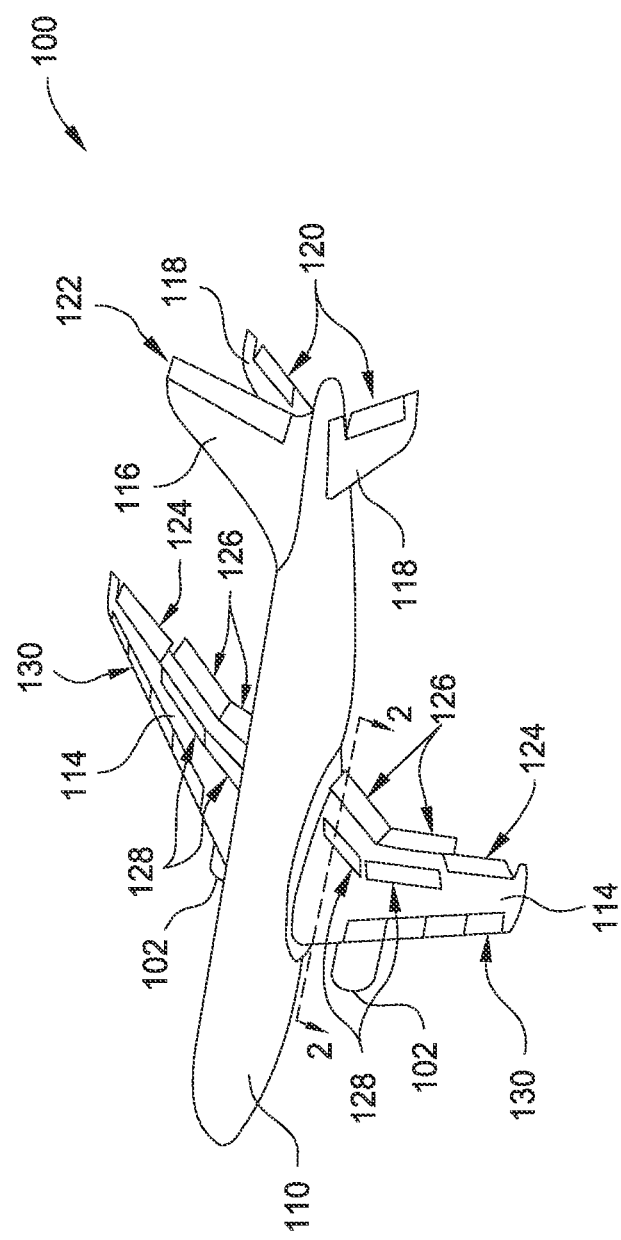
FIG. 1 schematically represents an aircraft, according to one aspect of the disclosure.

FIG. 1 schematically represents an aircraft 100 according to one aspect of the disclosure. The aircraft 100 illustrated in FIG. 1 includes fuselage 110 for holding passengers and/or cargo. Two wings 114, which provide the lift needed to fly the aircraft 100, are coupled to opposite sides of the fuselage 110. A vertical stabilizer 116 and two horizontal stabilizers 118 are coupled to the fuselage 110 at a trailing end thereof. One or more engines 102 (two are shown), which provide the thrust needed to propel the aircraft 100 forward, are coupled to the wings 114.

Also present on the wings 114 of aircraft 100 are spoilers 128, flaps 126, and slats 130, which may be referred to as secondary flight control surfaces. Spoilers 128 are located on the wings 114 and perform a variety of functions, including assisting in the control of vertical flight path, acting as air brakes to control the forward speed of the aircraft 100, and acting as ground spoilers to reduce wing lift to help maintain contact between the landing gear and the runway when braking. The flaps 126 and the slats 130 are located on the wings of the aircraft 100 to change the lift and drag forces affecting the aircraft 100, with the flaps 126 positioned at the trailing edge of wing 114 and the slats 130 positioned at the leading edge of the wing 114. When the flaps 126 and the slats 130 are extended, the shape of the wing 114 changes to provide more lift. With an increased lift, the aircraft 100 is able to fly at lower speeds, thus simplifying both the landing procedure and the take-off procedure.

The aircraft 100 also includes primary flight controls to facilitate directional changes of the aircraft 100 during flight. The primary flight control surfaces on the aircraft 100 include ailerons 124, elevators 120, and a rudder 122. The ailerons 124 are located on the trailing edges of the wings 114 of the aircraft 100 and control the roll of the aircraft 100. The elevators 120 are located on the horizontal stabilizer 118 of the aircraft 100 and control the pitch of the aircraft 100. The rudder 122 is located on the vertical stabilizer 116 and controls the yaw of the aircraft 100. In some aircrafts, there may be cables or wires (not shown) connecting pilot controls to actuators used to move the primary control surfaces.

Figure 2:
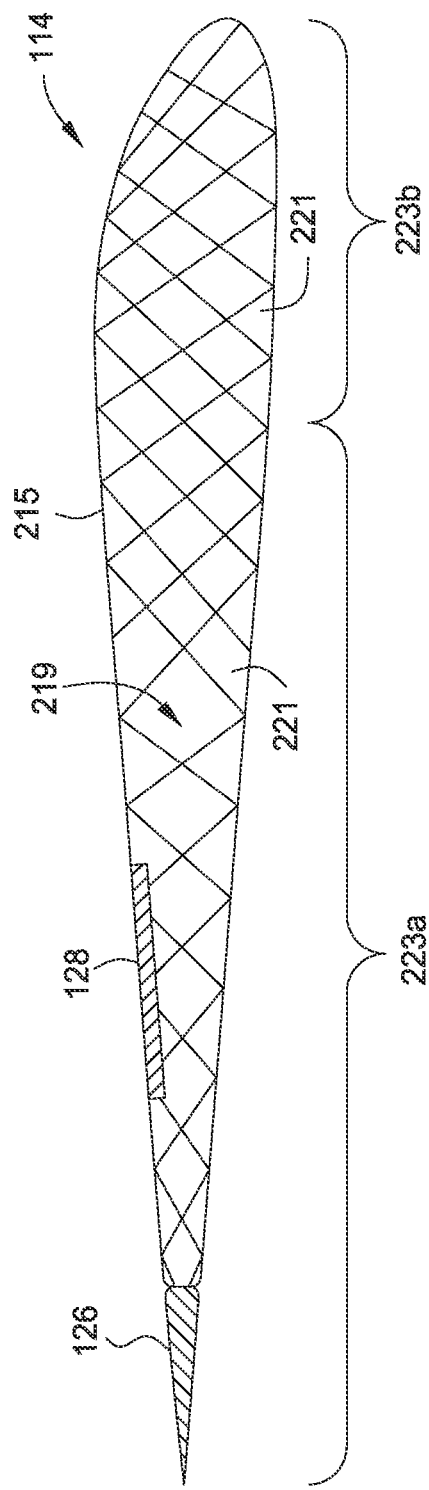
FIG. 2 is a diagrammatic representation of a sectional view of a wing of an aircraft, according to one aspect of the disclosure.

FIG. 2 illustrates a sectional view of a wing 114 of the aircraft 100 along section line 2-2, according to one aspect of the disclosure. The wing 114 includes an outer skin 215 defining the outward surface thereof. A three-dimensional, cross-linked wire truss structure 219 is positioned within the skin 215 to provide support to the skin 215 and to maintain the skin 215 in a predetermined shape. The three-dimensional, cross-linked wire truss structure 219 is a three-dimensional lattice structure formed by a plurality of cross-linked or intersecting wire segments of thermoplastic material. The wire segments of thermoplastic material are joined at respective intersections to form a unitary piece of material, thereby facilitating increased structural strength of the three-dimensional, cross-linked wire truss structure 219.

The three-dimensional, cross-linked wire truss structure 219 defines an open lattice structure having a plurality of openings 221 (two are labeled). The plurality of openings 221 facilitate the use of soluble tooling in conjunction with the three-dimensional, cross-linked wire truss structure 219. In one example, a soluble material or medium (not shown) may be used to support the segments of thermoplastic material while constructing the three-dimensional, cross-linked wire truss structure 219 such that the three-dimensional, cross-linked wire truss structure 219 has a desired shape or configuration. In such an example, the three-dimensional, cross-linked wire truss structure 219 may be positioned in a desired orientation, and a soluble material may be applied to the three-dimensional, cross-linked wire truss structure 219 to maintain the configuration of the three-dimensional, cross-linked wire truss structure 219. The three-dimensional, cross-linked wire truss structure 219 may then be cured to maintain the desired orientation, and the soluble material may then be removed.

Alternatively, a soluble material may be used to support the skins 215 relative to the three-dimensional, cross-linked wire truss structure 219 such that the skins 215 can be applied to the three-dimensional, cross-linked wire truss structure 219 and appropriate adhesion can occur therebetween. In one example, adhesion may occur via fusion bonding. The process of fusion-bonding in heating and melting the thermoplastic material at the bond locations of the components and then pressing these surfaces together for solidification and consolidation. Subsequent to adhesion, the soluble material can be selectively dissolved with respect to the thermoplastic material into a solvent and removed, leaving only the three-dimensional, cross-linked wire truss structure 219 and the skins 215. Unlike previously-used honeycomb structures, the openings 221 of the three-dimensional, cross-linked wire truss structure 219 are sufficiently large enough to allow the solvent to dissolve and to remove the soluble material used in soluble tooling. In one example, the porosity of the three-dimensional, cross-linked wire truss structure 219 may be about 50 percent or greater to facilitate removal of the soluble material.

Additionally, in further contrast to honeycomb structures, the density of the three-dimensional, cross-linked wire truss structure 219 (e.g., number of wire segment intersections per unit length) can be varied to reduce the weight of the three-dimensional, cross-linked wire truss structure 219 in relative areas of the wing 114. For example, the trailing three-quarters 223a of the wing 114 has a truss structure density less than the leading quarter 223b of the wing 114, thus facilitating a desired weight balance of the wing 114. In one example, the leading quarter of the wing 114 may have a weight about equal to the trailing three-quarters of the wing. It is desirable to shift the weight towards the leading edge of the chord to reduce the likelihood of flutter. In contrast, honeycomb structures generally have uniform densities, and thus, the only way to reduce the weight in the trailing edge of a wing when using the honeycomb structures is to completely remove portions of material. However, such removal may undesirably sacrifice structural rigidity and support, because material may be removed from key support areas within the wing 114. In contrast, the three-dimensional, cross-linked wire truss structure 219 may utilize a varied density along the length of the wing 114, such that weight is reduced by using a less-dense support structure, but structural support remains in key locations because the three-dimensional, cross-linked wire truss structure 219 is not completely removed for weight reduction purposes.

FIGS. 3A-3C illustrate three-dimensional, cross-linked wire truss structures 319a-319c of varied densities, according to aspects of the disclosure. FIG. 3A illustrates a three-dimensional, cross-linked wire truss structure 319a having a first density of thermoplastic segments 331a. The relative angle 332 of intersection between segments 331a, as well as the relative angle 333 of change of direction of each segment 331a can be adjusted to facilitate a desired level of density of the three-dimensional, cross-linked wire truss structure 319a.

FIG. 3B illustrates a three-dimensional, cross-linked wire truss structure 319b having a second density of thermoplastic segments 331b. In particular, the segments 331b have varying or graded densities along a length thereof. The segments 331b have a lower density in a region 334 and a greater density in a region 335. The density is adjusted by varying the angles 332, 333 along the length of the truss structure 319b. Thus, as illustrated, the density of the three-dimensional, cross-linked wire truss structure 319b can be varied along a length thereof (e.g., along the chord line) to produce the desired weight and support profile of the three-dimensional, cross-linked wire truss structure 319b.

FIG. 3C illustrates a three-dimensional, cross-linked wire truss structure 319c having overlapping or intertwined truss structures 335a, 335b. Thus, the three-dimensional, cross-linked wire truss structure 319c is formed from two separate truss structures 335a, 335b that may be simultaneously formed together, or may be subsequently formed relative to one another. For example, a truss structure 335a may be formed and positioned into a desired configuration, and then subsequently, a truss structure 335b may be formed about the truss structure 335a. As illustrated, the truss structure 335a extends all or most of the length of the chord, such as a wing chord, while the second truss structure 335b extends a partial distance of the chord, for example, about 30 percent to about 50 percent of the length of the chord. It is contemplated, however, that the second truss structure 335b may extend a greater or lesser length of the chord than is illustrated, such as about 10 percent to about 90 percent of the chord, for example, and, specifically, about 30 percent to about 70 percent of the length of the chord, for example.

The utilization of two separate truss structures 335a, 335b facilitates a more tailored approach to adjusting the relative weight and structural support of the three-dimensional, cross-linked wire truss structure 319c. In particular, a second truss structure, such as the truss structure 335b, can be used to shift weight to the forward quarter of the chord of a wing, or to provide increased structural support in areas of the wing that bear a greater percentage of a load. In contrast, honeycomb structures are not capable of such interlocking geometries, and thus, are more limited in shape and configurations.

Figure 4B:
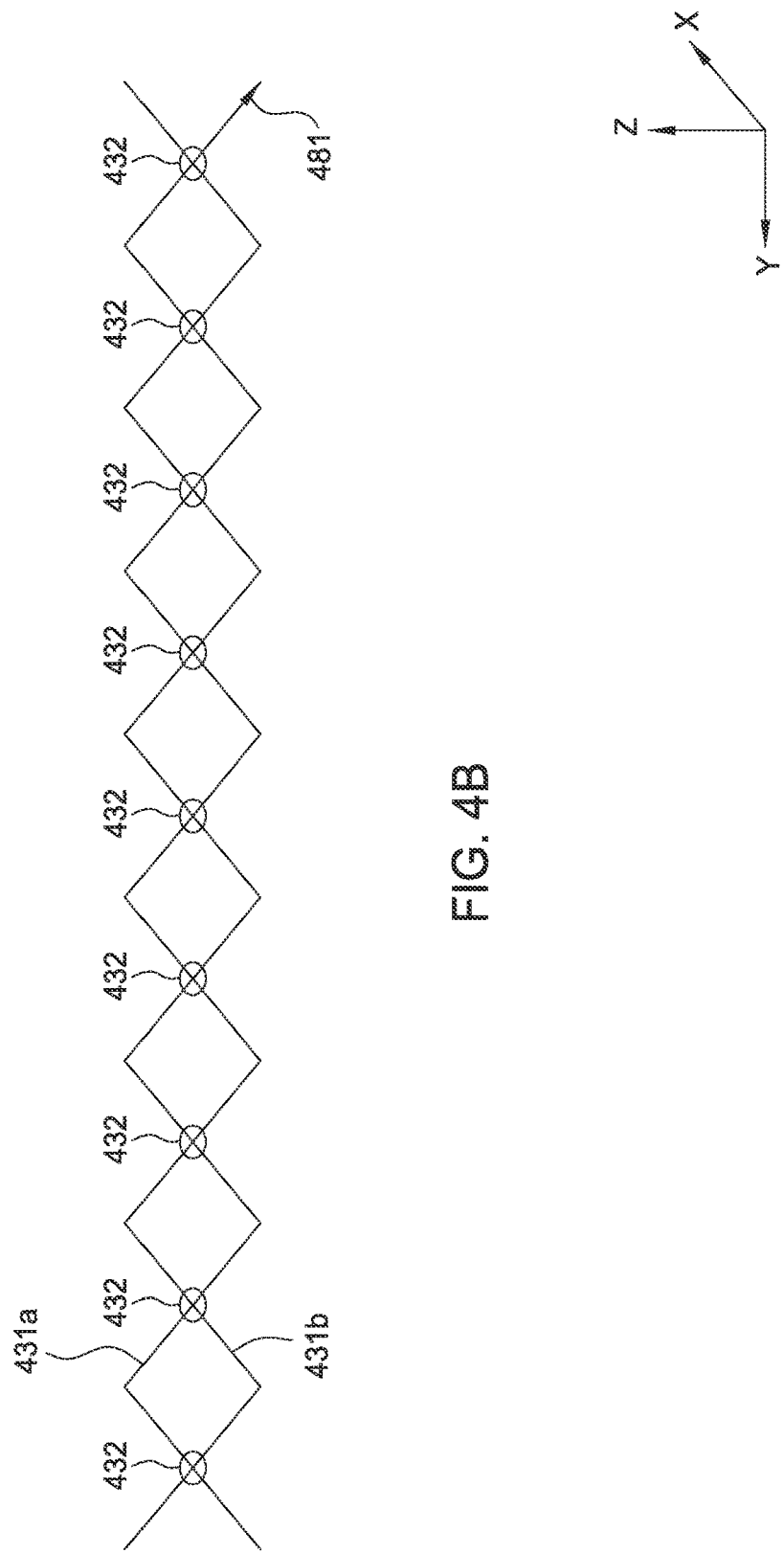
Figure 4F:
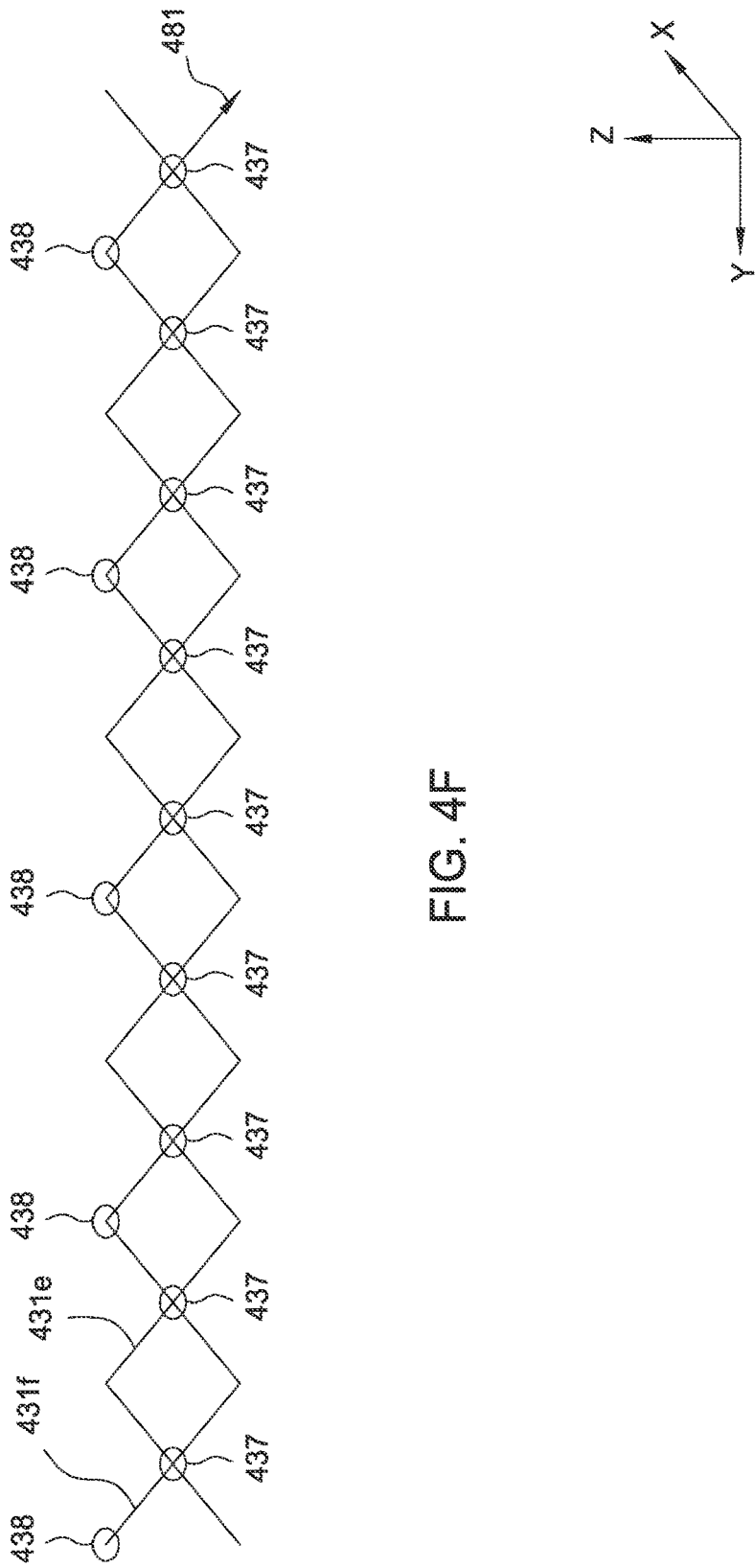

FIGS. 4A-4L illustrate formation of a three-dimensional, cross-linked wire truss structure, according to one aspect of the disclosure. FIG. 4A illustrates positioning of a first segment 431a of thermoplastic material. The first wire segment 431a is positioned on a supporting structure (not shown) in a saw tooth or zigzag pattern, as shown. The relative height of each zigzag, as well as the apexes of each zigzag per unit length, may be selected based on the desired structural needs and weight characteristics required by the finished support structure.

The first wire segment 431a may be dispensed from a roll of thermoplastic material using an automated placement device to position the first wire segment 431 in a desired zigzag configuration. In one example, the first wire segment 431a is placed by an automated placement device moving in a first direction (such as the positive y direction), as indicated by arrow 480, while sweeping back and forth in the z direction to form a zigzag pattern.

Subsequently, as shown in FIG. 4B, a second wire segment 431b of thermoplastic material is disposed in a saw tooth pattern over the first wire segment 431a. The saw tooth pattern of the second wire segment 431b is offset from the saw tooth pattern of the first wire segment 431a to form a crisscross pattern partially or entirely along the length of the first segment 431a and the second wire segment 431b. In one example, an automated placement device deposits the second wire segment 431b when traveling in a second direction opposite the first direction (e.g., along a return path), as shown by arrow 481. The second wire segment 431b may have a length about equal to the first wire segment 431a.

When positioning the second wire segment 431b, the number of intersections per unit length between the second wire segment 431b and the first wire segment 431a can be adjusted by changing the angles 332 and 333 (shown in FIG. 3B). Generally, more points of intersection in a given length of material provide more resistance to local buckling. In any given cross section, one half of the "X" formed by the intersection of the first wire segment 431a and the second wire segment 431b is in tension, while the other half is in compression, due to the forces acting upon the first wire segment 431a and the second wire segment 431b while supporting a load. The bonding between the portion in tension and the portion in compression reduces buckling of the portion in compression. A greater density of intersections per unit length can be used to further reduce local buckling; however, this may increase the density, and thus the weight, of the resultant truss supporting structure.

After placement of the second wire segment 431b, the second wire segment 431b and the first wire segment 431a may be joined at intersections 432 by heating the intersections 432 to a temperature sufficient to cause adhesion therebetween. In one example, a laser may be used to heat desired regions (e.g., the intersections of the second wire segment 431b and the first wire segment 431a) rather than the entire segments themselves, in order to facilitate bonding at desired locations.

When using a thermoplastic resin, such as polyetherketoneketone (PEKK) or polyetheretherketone (PEEK) (although other thermoplastic resins are possible and contemplated), the desired areas of the thermoplastic material may be heated to temperature within a range of about 550 degrees Fahrenheit to about 750 degrees Fahrenheit, such as about 600 degrees Fahrenheit to about 700 degrees Fahrenheit, to facilitate bonding of the first wire segment 431a and the second wire segment 431b. It is contemplated that pressure may be applied to the first wire segment 431a and the second segment 431b to facilitate adhesion (e.g., fusion-bonding).

After heating, the first wire segment 431a and the second wire segment 431b may be allowed to cool to facilitate setting of the bond. In contrast to epoxy materials, such as those used in honeycomb structures, bond formation using thermoplastic materials is much quicker. For example, bonds between thermoplastics may be formed and set in seconds or minutes, while bonds using epoxies require hours to set. Thus, utilization of thermoplastic materials, as disclosed herein, may facilitate reduced construction times compared to support structures using epoxies. Additionally, thermoplastic materials may be much more heat stable than epoxies and/or phenolics. For example, certain thermoplastic materials may be heat stable up to temperatures of about 600 degrees Fahrenheit, while certain epoxies may only be heat stable up to about 200 degrees Fahrenheit.

After bonding the second wire segment 431b and the first wire segment 431a, a third wire segment 431c is disposed over and aligned with first wire segment 431a, as shown in FIG. 4C. The third wire segment 431c may be positioned by an automated placement device traveling in the first direction, as indicated by arrow 480. Once the third wire segment 431c is positioned, the third wire segment 431c may be joined to the first wire segment 431a, for example, by heating portions of the first wire segment 431a and/or the third wire segment 431c to cause adhesion therebetween. As shown in FIG. 4C, the upward apexes of the saw tooth structures of the first wire segment 431a and the third wire segment 431c are joined together, as indicated at points 433.

After deposition and adhesion of the third wire segment 431c, a fourth wire segment 431d is disposed over and aligned with the second wire segment 431b, as shown in FIG. 4D. The fourth wire segment 431d may be deposited by an automated placement device traveling in the second direction, as indicated by arrow 481, and may be about the same length as the second wire segment 431b. The fourth wire segment 431d is joined to the third wire segment 431c at points 434. The fourth wire segment 431d may also be joined to the second wire segment 431b at the overlapping lower apexes of the saw tooth shapes formed by second wire segment 431b and fourth wire segment 431d, as indicated at points 435.

As illustrated in FIG. 4E, a fifth wire segment 431e is disposed over and aligned with the first wire segment 431a and the third wire segment 431c. The fifth wire segment 431e may be deposited by an automated placement device traveling in the first direction, as indicated by arrow 480. After placement of the fifth wire segment 431e, the fifth wire segment 431e may be adhered to the third wire segment 431c at the overlapping lower apexes of the third wire segment 431c and the fifth wire segment 431e, as shown at points 436. The fifth wire segment 431e may be adhered to the third wire segment 431c using a heat source such as a laser, similar as to that described above.

After placement of the fifth wire segment 431e, a sixth wire segment 431f is disposed over and aligned with the second wire segment 431b and the fourth wire segment 431d in a saw tooth pattern, as illustrated in FIG. 5F. The sixth wire segment 431f may be deposited by an automated placement device moving in the second direction, as indicated by arrow 481. The sixth wire segment 431f may have a length about equal to the length of the second wire segment 431b and the fourth wire segment 431d. The sixth wire segment 431f is adhered to the fourth wire segment 431d at the upper apexes and the intersections thereof using a heat source, such as a laser described above. The areas of adhesion are indicated at points 437, 438. The points 437 are the intersections of the fifth wire segment 431e and the sixth wire segment 437f. The adhesion points 438 are the upper apexes of the sixth wire segment 431f and the underlying fourth wire segment 431d.

Additional segments may be disposed on the structure to generate a truss structure of desired dimensions. For example, additional depositions and adhesions, such as those shown in FIGS. 4C-4F, may be repeated as desired. Additionally, it is to be noted that the particular adhesion points described herein are only examples, and other areas of adhesion between segments are contemplated.

FIG. 4G illustrates a rotated view of the segments 431a-431f in stacked configuration. Voids or spacing are illustrated between the wire segments 431a-431f for clarity. In FIG. 4H and FIG. 4I, the segments 431a-431f are shown in partially expanded configurations, respectively. FIG. 4H illustrates a top view of the three-dimensional, cross-linked wire truss structure 419, and FIG. 4I illustrates a corresponding perspective view of the three-dimensional, cross-linked wire truss structure 419. With reference to FIGS. 4G and 4H, the wire segments 431a-431f are expanded in the x direction to form a three-dimensional structure, e.g., a three-dimensional, cross-linked wire truss structure 419. It is contemplated that the level of expansion may be adjusted to produce a desired density or configuration of the three-dimensional, cross-linked wire truss structure 419.

Figure 4K:
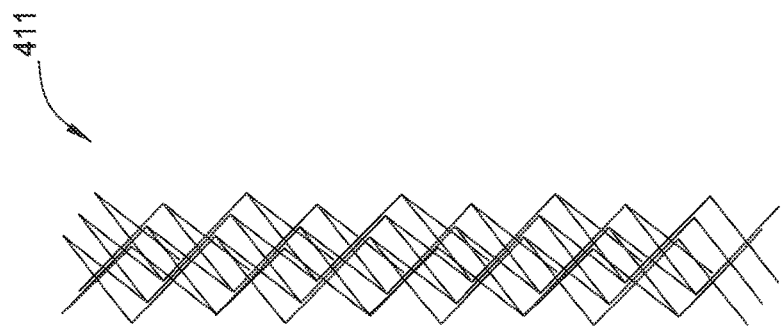
Figure 4J:
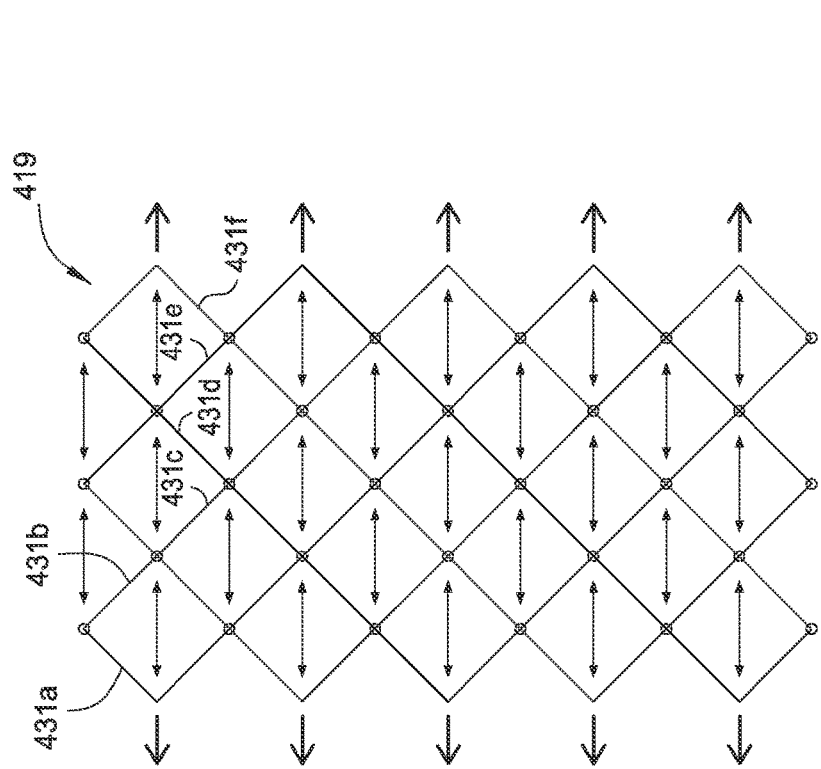

FIGS. 4J and 4K illustrate the three-dimensional, cross-linked wire truss structure 419 in a further-yet expanded configuration. FIG. 4J illustrates a top view of the three-dimensional, cross-linked wire truss structure 419, and FIG. 4K illustrates a corresponding perspective view of the three-dimensional, cross-linked wire truss structure 419. With the truss structure 419 expanded into a desired configuration, the three-dimensional, cross-linked wire truss structure 419 may be subjected to thermal processing, such as an annealing operation, to maintain the three-dimensional, cross-linked wire truss structure 419 in a desired configuration. The resultant, expanded, three-dimensional configuration in a hardened state is illustrated in FIG. 4L.

Figure 4L:
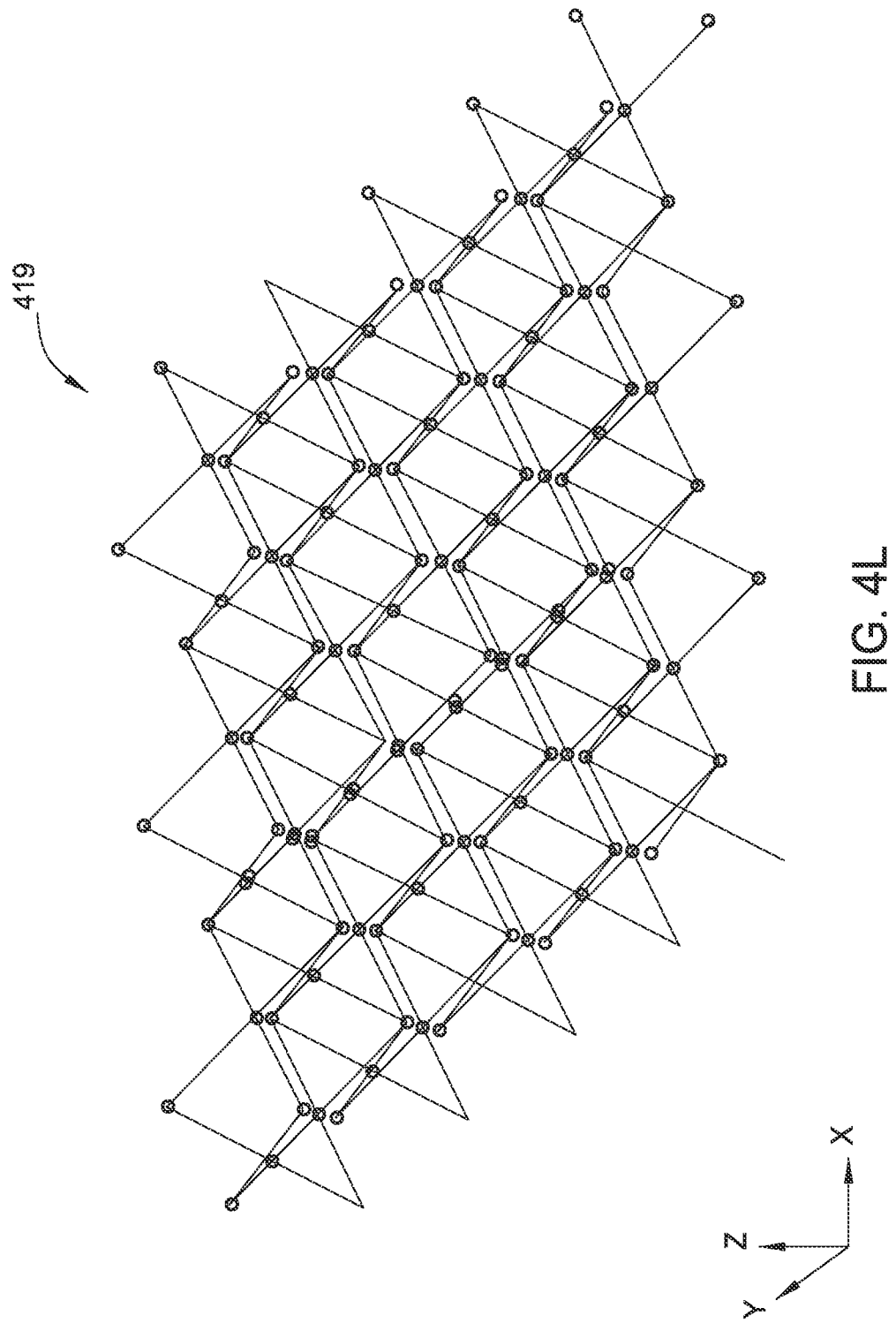

The structure in FIG. 4L may be shaped, for example, into a wing, a rotor blade, or another component, by trimming the three-dimensional, cross-linked wire truss structure 419 to a desired shape and/or size.

The wire segments 431a-431f may be expanded to a desired distance such that the saw tooth structures of each wire segment 431a-431f are oriented in desired directions, thus facilitating directional load transfer when a load is applied. Directional load transfer allows an increased structural load to be applied while using a relatively reduced amount of supporting material, thus reducing the weight of the three-dimensional, cross-linked wire truss structure 419. In contrast, honeycomb support structures (which are formed from paper strips in combination with epoxies or glue strips) are not adapted to support loads in particular directions, which may require more honeycomb material to be used to support a given load when compared to the three-dimensional, cross-linked wire truss structure 419.

The three-dimensional, cross-linked wire truss structure 419 also facilitates the use of thermoplastic skins (such as the skin 215 shown in FIG. 2), which may be lighter than comparable skins formed form other materials, such as aluminum. While thermoplastic skins are desirable, they have bonding issues with previously used support structure materials, such as honeycomb support structures, due to the bonding incompatibility between materials. However, due to the likeness in materials, thermoplastic support trusses can easily be bonded to thermoplastic skins. Thermoplastic skins may include, for example, wing skins or rotor blade skins formed from PEEK and/or PEKK.

In one example, the use of thermoplastic skins may allow a thermal process, used to maintain rigidity or configuration of the three-dimensional, cross-linked wire truss structure 419, to be omitted. In such an example, the wire segments 431a-431f may be expanded into the desired configuration, and then a soluble material used in soluble tooling, may be applied to the expanded structure, and allowed to set, to maintain the wire segments 431a-431f in the expanded configuration. Examples of soluble material include soluble ceramics available from Advanced Ceramics Manufacturing of Tucson, Ariz. It is contemplated that metallic materials having melting points below that of the thermoplastic material may also be used.

Thermoplastic skins may then be applied over the shape, and heated to form bonds between the thermoplastic skin and the three-dimensional, cross-linked wire truss structure 419. The soluble material may then be removed, leaving the three-dimensional, cross-linked wire truss structure 419 in a desired configuration due to the adhesive bonds between the three-dimensional, cross-linked wire truss structure 419 and the thermoplastic skin. Because extraneous adhesives are not utilized, the weight of the final structure is further reduced compared to previous structures.

While embodiments herein refer to the use of thermoplastic materials, such as PEEK and PEKK, it is contemplated that fiber-impregnated thermoplastic materials may also be used. In one example, carbon-fiber-impregnated thermoplastic materials or glass-fiber-impregnated thermoplastic materials may be utilized; however, the use of other fibers is also contemplated. The utilization of impregnating fibers increases the strength of thermoplastic resin, thereby allowing less thermoplastic resin to be used to support the same load, and thus, facilitates the production of a lighter weight truss support structure.

In one embodiment, a plastic segment, such as the wire segments 431a-431f, may have a diameter of about 0.0020 inches to about 0.0030 inches when non-impregnated, and may have diameter less than about 0.0020 inches, such as 0.0010 inches to about 0.0020 inches, when impregnated with fiber. In another example, the wire segments 431a-431f may have a diameter within a range of about 0.001 inches to about 0.25 inches. It is contemplated that the wire segments 431a-431f may have round cross sections or other cross sections. Additionally, the wire segments 431a-431f may hollow wire, which may improve buckling strength.

While embodiments herein are described with respect to aircraft wings and rotor blades, it is noted that the truss structures described herein may advantageously be used as support structures for other components, including those outside of aircraft components. Additionally, the truss structures described herein may be used in fluid containing vessels, such as fuel tanks, due to the open nature of the truss structures which allow fluids to flow therethrough. Moreover, while embodiments herein are described with respect to saw tooth patterns, it is contemplated that other oscillating or repeating patterns, such as sinusoidal patterns, may also be used. Additionally, embodiments herein utilize automated placement devices to position thermoplastic wires, however, it is contemplated that thermoplastic wires may also be positioned manually.

Benefits of the disclosure include open support structures having reduced weight and directional load-bearing abilities. The support structures may easily be bonded to thermoplastic skins, or may also be easily bonded to one another to generate larger support structures, due to material compatibility.

While the foregoing is directed to embodiments of the present disclosure, other and further embodiments of the disclosure may be devised without departing from the basic scope thereof, and the scope thereof is determined by the claims that follow.

What is claimed is:

1. A support structure, comprising:
a three-dimensional, cross-linked truss structure comprising a plurality of thermoplastic segments bonded together, the plurality of thermoplastic segments comprising:
a first segment having a saw tooth shape;
a second segment positioned adjacent the first segment, the second segment having a saw tooth shape offset from the first segment;
a third segment positioned adjacent the second segment, the third segment having a saw tooth shape offset from the second segment; and
a fourth segment positioned adjacent the third segment, the fourth segment having a saw tooth shape offset from the third segment, wherein the first segment and the second segment are bonded to one another at intersections thereof, wherein the first segment is bonded to the third segment at a subset of upper apexes of the first segment and the third segment, wherein the fourth segment is bonded to the third segment at intersections thereof, wherein the fourth segment is bonded to the second segment at a subset of lower apexes of the second segment and the fourth segment, and wherein the plurality of thermoplastic segments are bonded by fusion bonds.

2. The support structure of claim 1, wherein the thermoplastic segments each include fibers impregnated therein.

3. The support structure of claim 2, wherein the fibers are carbon fiber.

4. The support structure of claim 2, wherein the thermoplastic segments have a diameter within a range of about 0.0010 inches to about 0.0020 inches.

5. The support structure of claim 1, wherein the thermoplastic segments comprise polyetherketoneketone.

6. The support structure of claim 1, wherein the thermoplastic segments comprise polyetheretherketone.

7. The support structure of claim 1, wherein the thermoplastic segments are hollow.

8. The support structure of claim 7, wherein a skin is bonded to the three-dimensional, cross-linked truss structure by fusion-bonding.

9. The support structure of claim 1, further comprising a skin disposed on and bonded to the three-dimensional, cross-linked truss structure.

10. The support structure of claim 1, wherein the thermoplastic segments have a diameter within a range of 0.0010 inches to about 0.0020 inches.

11. The support structure of claim 1, wherein the plurality of thermoplastic segments have a density that varies along a length of the support structure.

12. A support structure, comprising:
a three-dimensional, cross-linked truss structure comprising a plurality of thermoplastic segments bonded together, the plurality of thermoplastic segments each having a saw tooth configuration including upper and lower apexes, wherein the plurality of thermoplastic segments includes:
a first thermoplastic segment having upper apexes thereof bonded to upper apexes of a second thermoplastic segment and lower apexes of the first thermoplastic segment bonded to lower apexes of a third thermoplastic segment; and
a fourth thermoplastic segment bonded to the first thermoplastic segment at intersections of the fourth thermoplastic segment and the first thermoplastic segment, wherein the plurality of thermoplastic segments are bonded by fusion bonds.

13. The support structure of claim 12, wherein the thermoplastic segments each include fibers impregnated therein.

14. The support structure of claim 13, wherein the fibers are carbon fiber.

15. The support structure of claim 12, wherein the thermoplastic segments have a diameter within a range of about 0.0010 inches to about 0.0020 inches.

16. The support structure of claim 12, wherein the thermoplastic segments comprise polyetherketoneketone.

17. The support structure of claim 12, wherein the thermoplastic segments comprise polyetheretherketone.

18. The support structure of claim 12, wherein included angles of the upper and lower apexes vary along a length of thermoplastic segments.

19. A support structure, comprising:
a first three-dimensional, cross-linked truss structure comprising a plurality of thermoplastic segments bonded together, the plurality of thermoplastic segments each having a saw tooth configuration having a plurality of upper and lower apexes, wherein the plurality of thermoplastic segments includes:
a first thermoplastic segment having upper apexes thereof bonded to upper apexes of a second thermoplastic segment and lower apexes of the first thermoplastic segment bonded to lower apexes of a third thermoplastic segment; and
a fourth thermoplastic segment bonded to the first thermoplastic segment at intersections of the fourth thermoplastic segment and the first thermoplastic segment, wherein the plurality of thermoplastic truss segments of the first three-dimensional, cross-linked truss structure each include fibers impregnated therein; and a second three-dimensional, cross-linked truss structure comprising a plurality of thermoplastic segments bonded together, wherein the second three-dimensional, cross-linked truss structure is separate but intertwined with the first three-dimensional, cross-linked truss structure.

\* \* \* \* \*